Aug. 16, 1927.  P. CULHANE  1,639,490
PULLEY
Filed Dec. 9, 1925
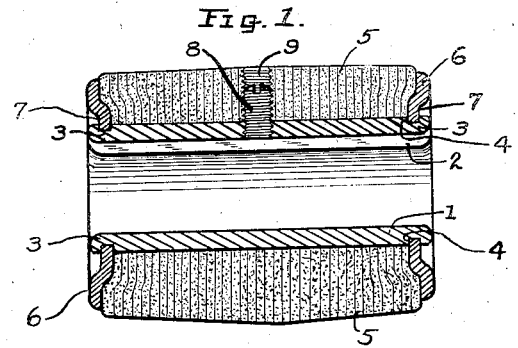
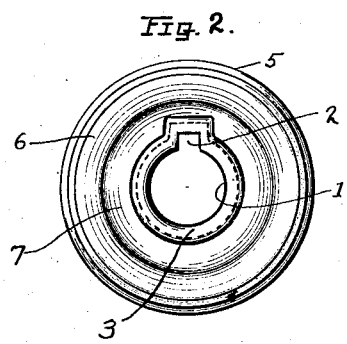
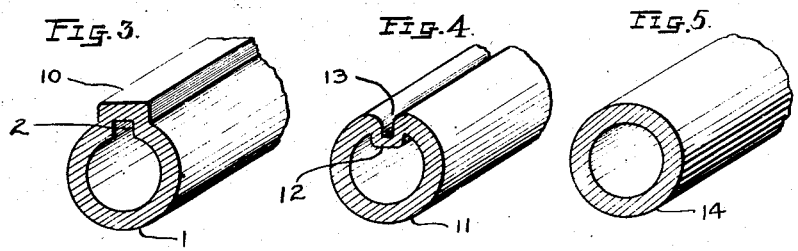
INVENTOR
P. Culhane
Floyd L. Evans
ATTORNEY Patented Aug. 16, 1927.

1,639,490

UNITED STATES PATENT OFFICE.

PATRICK CULHANE, OF CLEVELAND, OHIO, ASSIGNOR, BY MESNE ASSIGNMENTS, TO WILLIAM T. HENSLEY, OF INDIANAPOLIS, INDIANA.

PULLEY.

Application filed December 9, 1925. Serial No. 74,311.

This invention relates to pulleys having a soft outer frictional surface for power transmission and more particularly to pulleys of the above type in which a metal sleeve or hub of the pulley engages the power shaft.

It frequently becomes desirable to provide a pulley having a soft outer frictional surface for use with a power shaft having a relatively large diameter in comparison with the diameter of the pulley. It is preferable that such pulleys be of simple and rugged construction; and also that such pulleys be balanced in order to obtain smooth and efficient power transmission.

An object of this invention is to provide a pulley having a soft outer frictional surface, said pulley having a metal hub adapted to maintain the pulley in assembled relation.

Another object of my invention is to provide a pulley having a metal hub shaped to cooperate with, or to act as, means to key said pulley to a shaft.

A further object of this invention is to provide a pulley having a soft outer frictional surface formed by laminæ mounted on a hub, said hub being shaped to prevent circumferential movement of said laminæ on said hub.

Another object of the invention is to provide a pulley having a soft outer frictional surface and a suitably shaped metal hub, said pulley being substantially balanced for rotation on a shaft.

Other objects of the invention will be apparent to those skilled in the art from the description hereinafter given.

In the drawings, Figure 1 is a cross sectional view of a pulley embodying my invention.

Fig. 2 is an end elevation of the same pulley.

Fig. 3 is a perspective view of a portion of the hub or sleeve of a pulley such as shown in Figs. 1 and 2.

Fig. 4 is a perspective view of a portion of a modified form of pulley hub.

Fig. 5 is a perspective view of a portion of another modified form of pulley hub.

One form of pulley contemplated by my invention is shown in Figs. 1, 2 and 3 in which 1 is a metal hub or sleeve. The hub 1, which may preferably be formed from seamless tubing, is shown as shaped, as by swaging, to form a keyway 2. The ends 3 of the hub may be reduced in external diameter for convenience in swaging said ends over end plates, as will be hereinafter explained. A shoulder 4 is preferably formed where the end portions of the hub are reduced in thickness. The soft outer frictional surface of the pulley is formed by assembling on the hub, a body portion comprising perforated laminæ 5, such as of paper or fiber board. The perforations in such laminæ preferably conform to the external shape of the hub. End plates 6 are shown as assembled on the reduced hub portions adjacent to the shoulders 4. To maintain the pulley in assembled relation, the end portions 3, which preferably extend beyond the adjacent portions of the end plates 6 are swaged or upset upon the end plates 6. The hub 1 thereby forms in effect a rivet maintaining the component parts of the pulley in assembled relation, the laminæ 5 being confined by the end plates 6, and the end plates being maintained rigidly between the shoulders 4 and the upset portions of the ends 3. It will be noted that where end plates depressed as at 7 are employed, the upset portions of the hub 1 need not extend outwardly beyond the plane of each end plate 6. It will be understood, however, that in certain cases it may not be desired to reduce the thickness of the ends of the hubs 1, and also it may be frequently desirable to employ straight end plates.

In the manufacture of the pulley, the shoulders 4 form limiting stops for the end plates 6, when the laminæ and end plates are subjected to pressure in a press. Thus the pulleys may be readily made of uniform width.

To lock the pulley on a shaft, a threaded screw 8, movable in threaded portion 9, may be employed. The screw 8 may cooperate with a key disposed within the keyway 2 or may be arranged to cooperate directly with the power shaft. It will be noted in the form of hub shown in Figs. 1, 2 and 3 that an external rib 10 is provided, which is advantageous in preventing circumferential movement of the laminæ 5 about the hub 1.

In Fig. 4 is shown a modified form of hub portion 11 shaped to provide an internal key 12 and an external depressed portion 13.

The hub 11 is also preferably formed from seamless tubing as by swaging. The internal key 12 is, of course, adapted to cooperate with a power shaft provided with a keyway. The depressed portion 13 is also of advantage in preventing circumferential movement of the laminæ 5 with respect to the hub, the perforations in the laminæ in such case, preferably corresponding substantially with the external shape of the hub 11.

Fig. 5 shows another modified form of hub, comprising a substantially cylindrical tube 14.

This form of hub is adapted for use where the power shaft is not provided with a keyway. Where a pulley having a hub similar to that shown at 14 is employed, the power shaft is preferably provided with a flat surface for engagement with a set screw such as shown at 8.

With respect to hubs having a non-circular cross section, such as the forms shown in Figs. 3 and 4, the thickness of the walls of such hubs is preferably suitably apportioned so that the longitudinal axis of the finished pulley will also be the center of gravity thereof in order that the pulley will be balanced and transmit power smoothly and efficiently. Thus, for example, referring to Fig. 3, the portion 10 would preferably be thinner than the lower portion of the hub in order that the center of rotation of the hub will be the center of gravity thereof.

It will thus be seen that I have provided a pulley of simple construction adapted for small pulleys or for use where the diameter of the shaft is relatively large with respect to the diameter of the pulley.

It will also be noted that I have provided a balanced pulley of simple construction adapted to transmit power smoothly and efficiently.

Furthermore, it is to be understood that the particular form of apparatus shown and described, and the particular procedure set forth, are presented for purposes of explanation and illustration and that various modifications of said apparatus and procedure can be made without departing from my invention as defined in the appended claims.

What I claim is:

1. A pulley comprising a hub, end plates mounted on said hub, a body of fibrous laminated material secured upon the hub and between the end plates, the said hub being shaped to form an internal keyway and an external rib and having its external surface conforming substantially in contour to its internal surface, the portion of the hub adjacent to said keyway and rib being thinner than the rest of the hub, so that said pulley is substantially balanced for smooth, efficient operation on a power shaft.

2. A pulley for power transmission comprising, in combination, a hollow hub having an interior surface of substantially circular cross section with a keyway space extending outwardly of said circular portion, the exterior of said hub conforming substantially in shape to the interior surface thereof, a body portion of fibrous laminated material mounted on said hub, said material having an internal contour shaped to conform substantially to the external contour of said hub, metal end plates mounted on the hub at each end of the body portion, the ends of said hub extending beyond the adjacent portions of the end plates and being upset thereon whereby to rivet said pulley in assembled relation.

3. A pulley for power transmission comprising, in combination, a hub, the ends of said hub being reduced in external dimension and shouldered, laminated fibrous material mounted on said hub, end plates formed to compact the central portions of said material mounted on the reduced ends of said hub, said reduced hub ends extending beyond the end plates and being upset thereon so as to place said fibrous material under pressure with said end plates abutting said shoulders, whereby to form an assembled pulley of predetermined width and character of frictional surface.

In testimony whereof I affix my signature.

PATRICK CULHANE.